INVENTOR.
WALLACE E. BRAINARD
ERICH F. DRECHSLER
BY Robert C. Jones

March 2, 1971  W. E. BRAINARD ET AL  3,566,516

MULTIPLE SPINDLE TOOL CHANGER

Filed April 23, 1968  6 Sheets-Sheet 4

INVENTOR
WALLACE E. BRAINARD
ERICH F. DRECHSLER
ATTORNEY

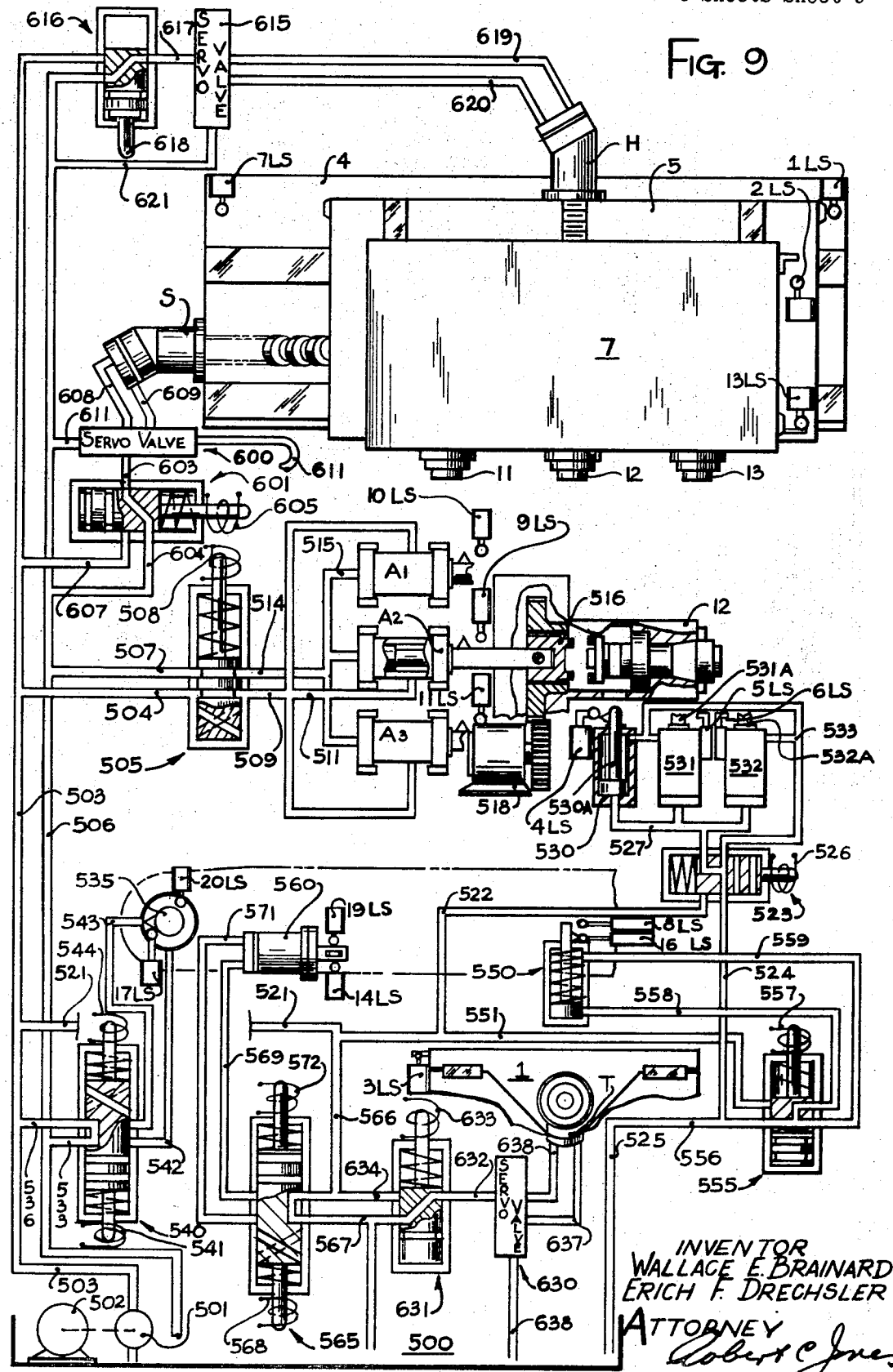

March 2, 1971 W. E. BRAINARD ET AL 3,566,516
MULTIPLE SPINDLE TOOL CHANGER
Filed April 23, 1968 6 Sheets-Sheet 6
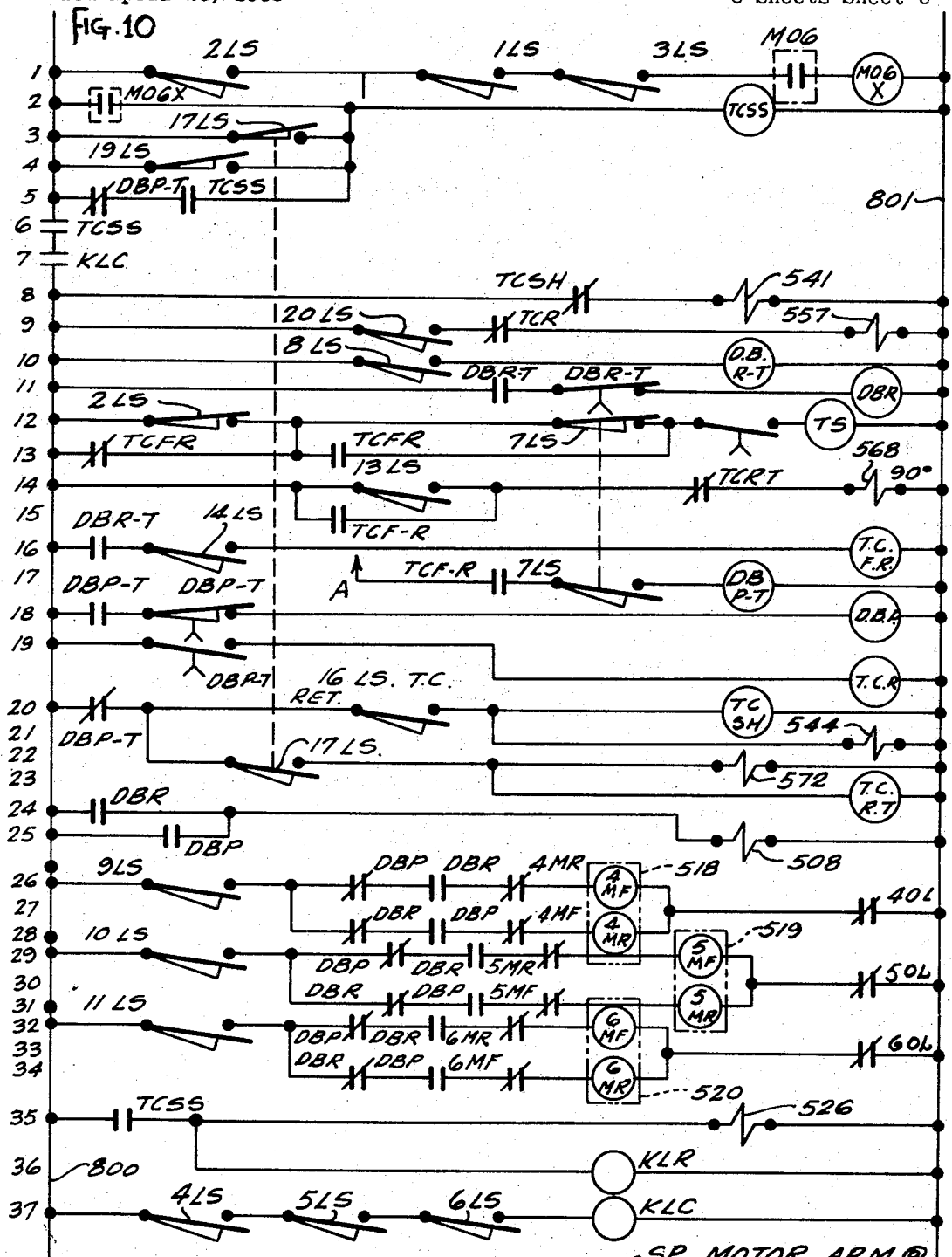
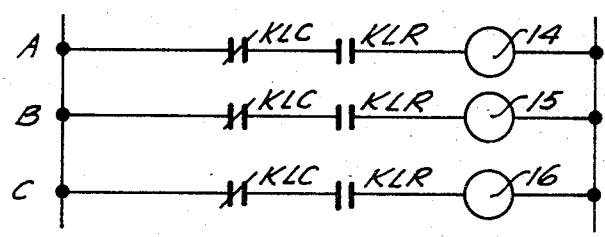
INVENTORS
WALLACE E. BRAINARD
ERICH F. DRECHSLER
BY Robert C. Jones
ATTORNEY

United States Patent Office 3,566,516
Patented Mar. 2, 1971

3,566,516
MULTIPLE SPINDLE TOOL CHANGER
Wallace E. Brainard, New Berlin, and Erich F. Drechsler, Milwaukee, Wis., assignors to Kearney & Trecker Corporation, West Allis, Wis.
Filed Apr. 23, 1968, Ser. No. 723,372
Int. Cl. B23q *3/157*
U.S. Cl. 29—568      8 Claims

ABSTRACT OF THE DISCLOSURE

The disclosure relates to a multiple spindle profiler for producing a plurality of milling operations simultaneously on the same or identical workpieces and includes keylock mechanisms for a positive drive between the cutters and the spindles with orienting mechanism to stop the spindles in a particular position to cooperate with tools brought to the spindles by a tool change mechanism. The tool change mechanism is adapted to change the tools that have been used for tools that are going to be used, and the machine as a whole as well as the tool changing operation, are all automatically carried out under the control of a tape.

BACKGROUND OF THE INVENTION

The invention relates to the metalworking art and more especially embraces the combination of a multispindle profiler and tool change means for the spindles of the profiler. In particular, the invention is applied to an automatic tape control machine which operates the machine in cycles with different tools in each cycle and the tool change means is automatically controlled by the tape for automatically exchanging tools between cycles.

In the prior art, there are automatic tool changers that change tools in the single spindle of milling machines but no prior art is known that changes tools in multispindle machines, either simultaneously or automatically. Prior to this invention, multispindle machines had to have the tools changed by hand, and in many instances, this was a particular problem in large machines where the tools were heavy cutters. Not only was there considerable labor in the manual changing of tools, spindle after spindle, in a multispindle machine, but the time consumed in the operation rendered the operation very inefficient. There are patents dealing with heavy cutters, but these patents merely provide a support for presenting heavy tools to a spindle and holding them while they are manually secured or released from the spindle, the support being manually operated. Note Kaiser 2,685,823. These patents do not provide a holder for the used tool and a holder for the new tool. One holder is used in both instances and is associated with only a single spindle. Pankonin 3,288,032 provides two sets of holders, each set having a holder for the used tool and a holder carrying the next tool to be used. Each set is manipulated by hand and the change of tools in a plurality of spindles is neither accomplished simultaneously nor automatically. Under the present invention, the machine has its tools automatically exchanged, with tools of all the spindles exchanged simultaneously and there is no normal operation involved in the procedure.

BRIEF SUMMARY OF INVENTION

The invention is directed to a tape controlled multispindle profiler and a tool change mechanism for changing the tools in the multispindles, here disclosed as three, for coordinated movements under the control of input data from tape for multimachining operation, each machining operation using a different tool. In this machine, the plural machining operations are performed on either a single workpiece or on identical pieces at the same time. The tool changer includes a frame movable from an inoperative position to an operative position adjacent the tools. Mounted on the frame is a subframe carrying two groups of sockets, one group of sockets being empty for receiving the tools in the spindles and the other group of sockets carrying new tools to be placed in the spindles. In operation, the spindles are moved to tool change position, the empty sockets are moved by the subframe to engage the tools in the spindles, the spindle head is raised to withdraw the spindles from the tools, the sockets are rotated with respect to the subframe to place the new tools in operating position, the head is shifted to align the spindles with the new tools and the new tools are engaged in the spindles and secured, whereupon the tool change frame moves to inoperative position and the machine proceeds on the next operation, all under automatic control. During the machining operation, the old tools are withdrawn from the tool changer and the tools to be next used are placed in the tool changer to set up the tool changer for the next tool change operation. The operation of exchanging the tools in the tool changer can be accomplished manually or by automatic machine, but in either case, this operation does not impair the efficiency of the machine because it is accomplished while the machine is proceeding on a machining operation.

BRIEF DESCRIPTION OF THE DRAWING

FIG. 9 is a diagrammatic view of the hydraulic circuit; and,

FIG. 10 is a wiring diagram illustrating the electrical control circuit for controlling the operation of the various components in a tool change cycle of operation.

DESCRIPTION OF THE PREFERRED EMBODIMENT

Figure 1:
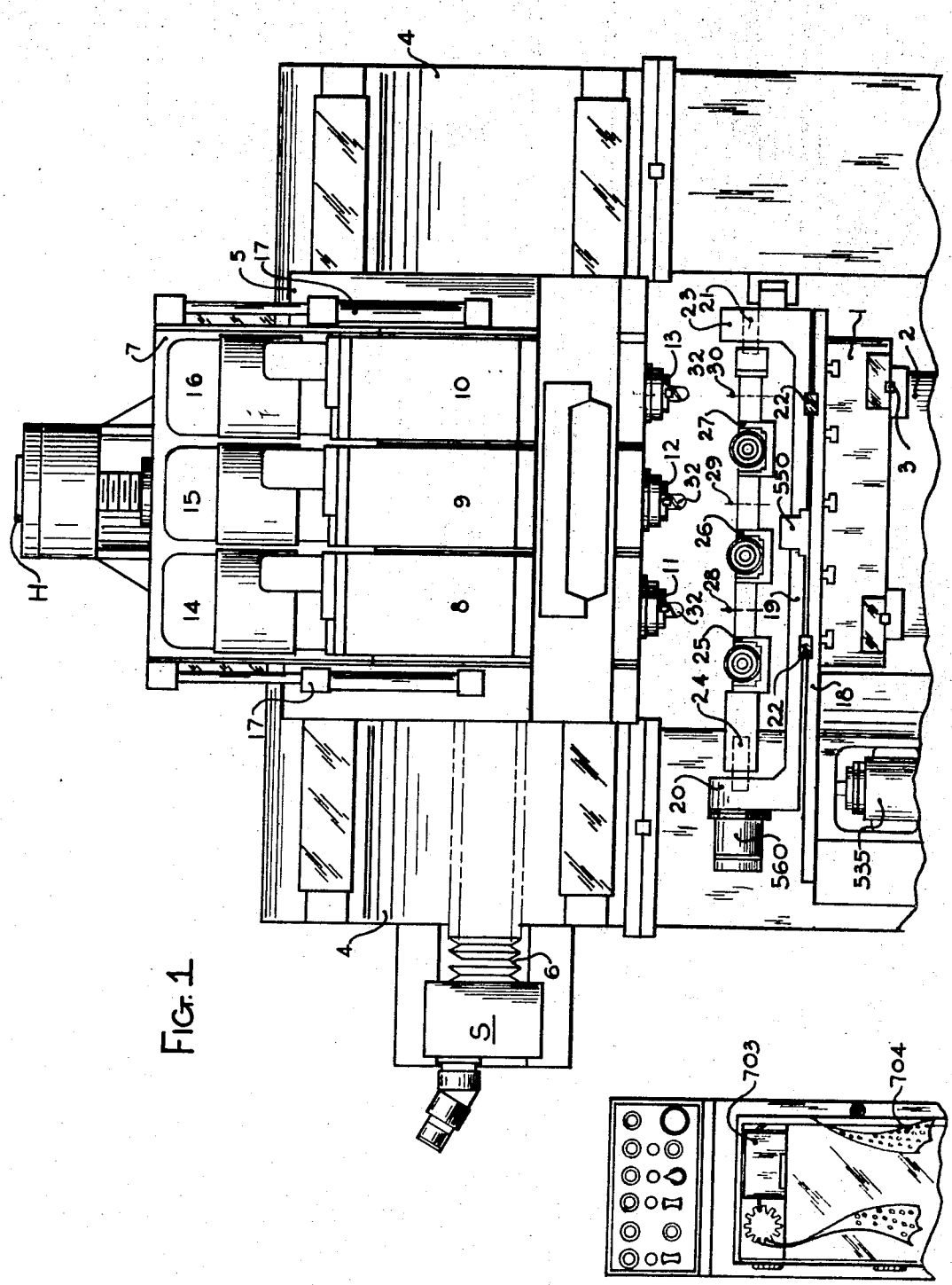
FIG. 1 is a view in front elevation of a three spindle machine showing the tool changer moved from its parked to its operative position.
Figure 2:
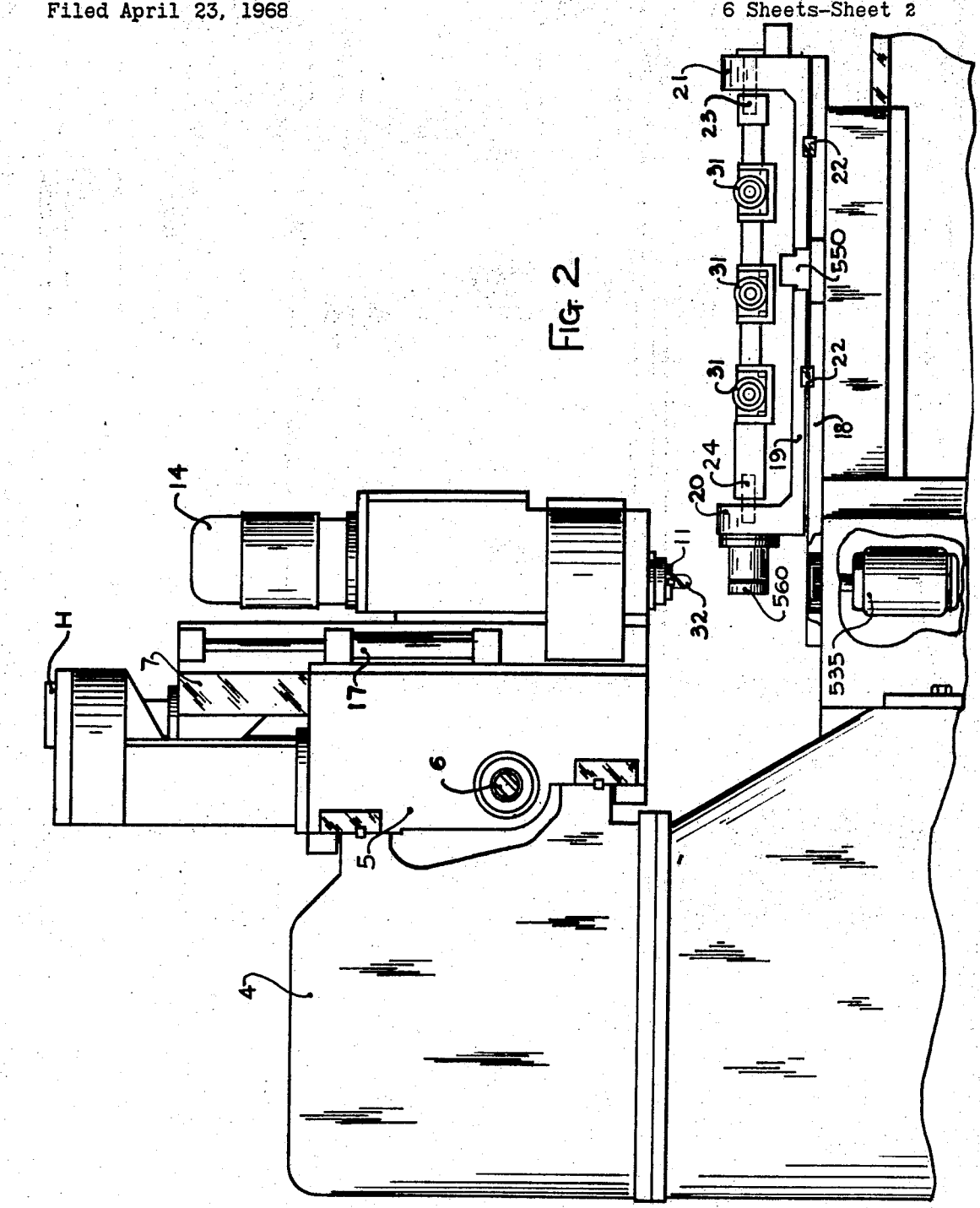
FIG. 2 is a view in left side elevation showing the tool changer in the parked position.
Figure 3:
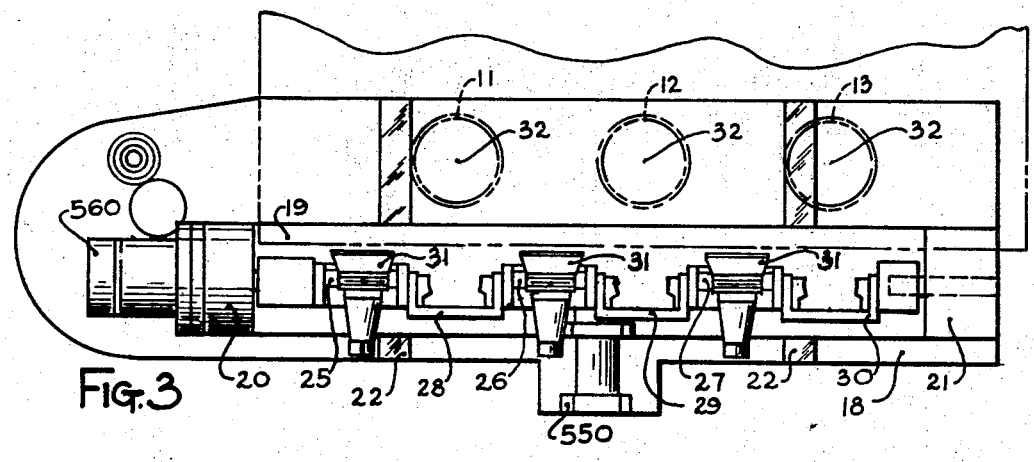
FIG. 3 is a top view of the tool changer in operative position with the sockets in retracted position in front of the three spindles disclosed in dotted lines.
Figure 4:
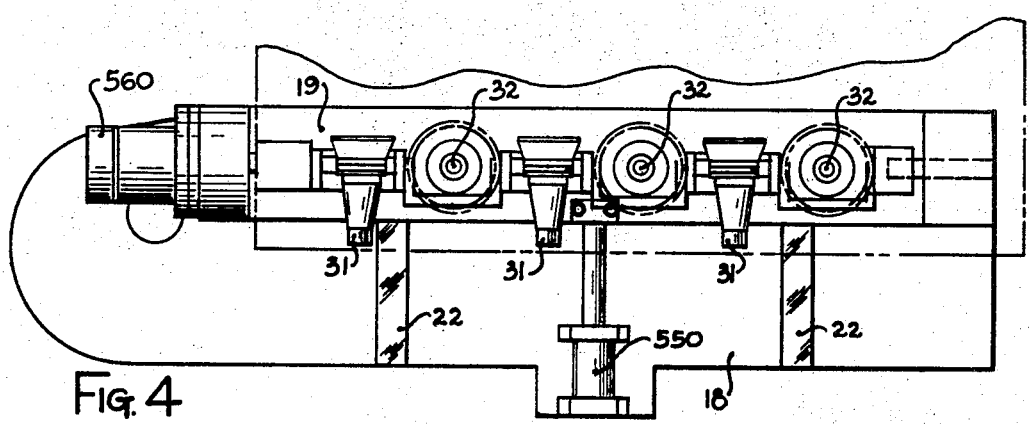
FIG. 4 shows the tool changer having the sockets moved to align the empty sockets with the tools in the spindles.
Figure 5:
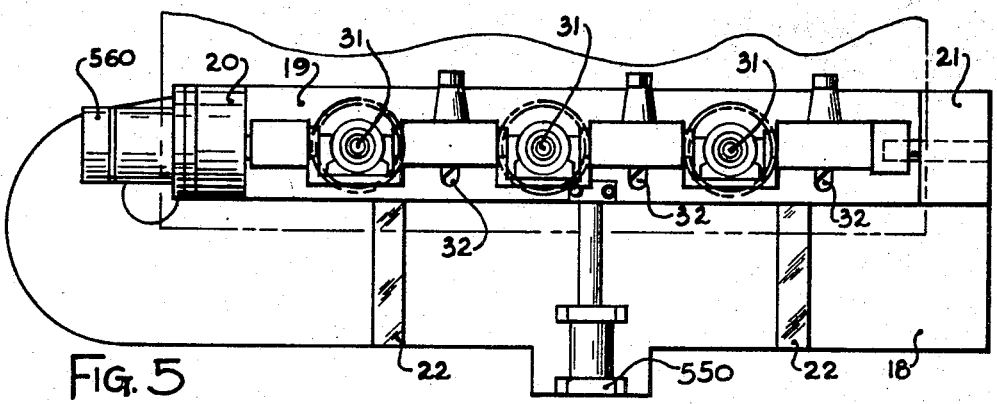
FIG. 5 is a front view of the tool changer showing the used tools in the sockets and positioned in upright position.

As shown in FIG. 1, the worktable 1 is adapted to slide along the guideway 3 at the top of base 2. The machine frame 4 mounts the saddle 5 for horizontal movement under the influence of motor S and screw 6, and mounted for vertical sliding movement under control of the fluid motor H is a head 7 which mounts the spindle housings 8, 9 and 10, containing the spindles 11, 12 and 13, each spindle being rotated by its corresponding motor 14, 15 and 16. Cooperating with the saddle and head and mounted at each side of the head are counterbalances 17. Above the level of the table 1 is a tool changer frame or plate 18 which is adapted to be swung around a vertical axis X by a motor 535 from an inoperative position that it occupies as depicted in FIG. 2 to an operating position as shown in FIG. 1. The plate 18 is adapted to slidably support a U-shaped member 19 having upright ends 20 and 21. The U-shaped member 19 is adapted to be moved forward and backward on guides 22 by operation of an actuator 550. Journaled in the uprights 20 and 21 are a series of connected toolholders or sockets 25, 28, 26, 29, 27 and 30, the sockets being rotatable through an arc of 90° by the motor 560. The series of sockets are in two groups, one group of sockets 28, 29 and 30 being empty sockets adapted to receive the tools that are in the spindles and the other group of sockets 25, 26 and 27 hold the new tools that are to replace the tools in the spindles. When a tool change is called for by the tape, the tool changer swings around the vertical axis X from its inoperative position to an operative position, as shown in FIG. 1, and in the diagrammatic form in FIG. 3 where the U-shaped frame is in retracted position alongside the spindles 11, 12 and 13, and after the spindles have been lowered to proper height, the U-shaped frame is advanced to pass the empty sockets into gripping engagement with the tools, the position at the end of this operation being shown in FIG. 4. The head is then raised to elevate the spindles so that the connected sockets may be rotated by the motor 560 through an arc of 90° which will position the previously used tools just received from the spindles in the horizontal position and the tools to be inserted in the spindles in vertical position, as depicted in FIG. 5. After this rotation of the sockets, the saddle 5 is moved laterally to the left, as viewed in FIG. 1, to align the axes of the spindles 11, 12 and 13 with the axes of the new tools carried in the sockets 25, 26 and 27, respectively. Thereafter, the head is lowered to engage the new tools and the changer is retracted, leaving the new tools in the spindles. The tool changer is then swung around to an inoperative position and the series of sockets rotated 90° back to their original position wherein the old tools may be removed and new tools placed in the sockets. During this operation of setting up the tool changer for the next tool change, the tape controls the machine for cutting operations with the new tools and, although the exchange of tools with respect to the tool changer in inoperative position may be carried out by hand, this will not affect the efficiency of the machine, which is operating in accordance with the tape control. The change of tools could be made by machine operation if desired. FIGS. 3, 4 and 5 are plan views illustrating the guideways 22, the new tools 31, and the old tools 32, whereas in FIG. 6, which is also a plan view but depicts the condition after the tool changer has been retracted to inoperative position, the old tools 32 are lying in horizontal position.

Figure 7:
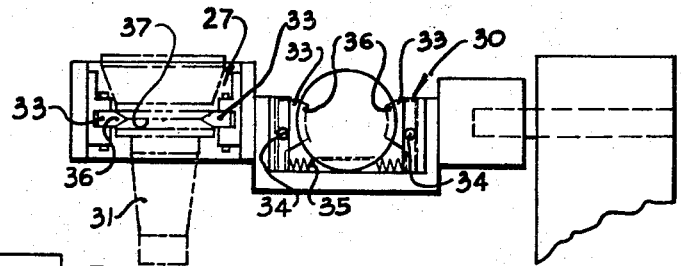
FIG. 7 is a fragmentary enlarged detail view showing the socket construction and mounting.

The construction of the sockets and the manner in which they engage and hold the tools is disclosed in FIG. 7. As disclosed, each socket includes opposed gripping members 33, each movable about a pivot 34 and held in an engageable position by a spring 35. Opposing edges 36 of the grippers 33 are V-shaped in cross-section and are curved arcuately as shown in FIG. 7, the curved arcuate edges gripping the annular V-recesses 37 in the tools.

To recapitulate, a tool change operation is automatically carried out by the machine under the command of the tape input data, the tool exchange frame or platform swings from an idle or inoperative position to the left of the machine, as shown in FIG. 2, to a position in front of the machine, FIG. 1, alongside the spindles, FIG. 3, carrying the new tools in horizontal position. The head 7 is lowered by tape control to tool exchange height. Thereafter, the U-shaped frame 19 is advanced towards the tools presented by the spindle by the motor 550 causing the grippers 33 to automatically grip the annular V-recesses in the tools that are then in the spindles. The head 7 is then elevated by tape control to a clearance position to disengage the spindles from the tools; the U-shaped frame 19 is rotated 90° by motor 560, FIGS. 4 and 5, to place the previously used tools in horizontal position and the new tools in vertical position. Simultaneously, the head 7 is shifted leftwardly, as viewed in FIG. 2, by tape control to a position indicated by the limit switch 7LS wherein the spindles are positioned in alignment with the new tools; the head 7 is then moved downwardly to engage the spindles with the new tools. Thereafter, the U-shaped frame is retracted, the changer moved to inoperative position, and the U-shaped frame 19 rotated 90°.

Prior to moving the head 7 upwardly for the purpose of disengaging the spindles from the used tools, the tools must be released from the spindles. Conversely, after the new tools are positioned and the head is moved down to engage the spindles with the new tools, the spindles have to be secured to the new tools. This is accomplished by the usual drawbar mechanism which, in accordance with the present specific disclosure, is of the type disclosed in the patent to Parske et al. 3,038,386 and also disclosed in a general way in FIG. 9.

It is also contemplated that the drive between the spindles and the tools may be a positive drive, and to this end, the spindles and the tools have cooperating keylock constructions. To enable the keylock construction to properly engage during the tool interchange, the new tools are placed on the new tool sockets with the keylock in proper oriented position and the spindles have their rotations stopped with their keylock construction oriented in the same relationship as the tools in the sockets. The stopping of the spindles in keylock position is accomplished by providing the spindles with slots, and when it is desired to stop the spindles for a tool interchange, the rotational speeds of the spindles are reduced and shot pins are shot in to feel the periphery of the spindles until they are engaged in the slots of the spindles as more specifically brought out in the description of the hydraulic control circuit of FIG. 9. It is here brought out that the machine tool is automatically tape controlled, numerically controlled, or controlled by other programming mechanism, to cause the machine to create a number of different cycles of machining operations with different tools at each cycle, and that the automatic control automatically exchanges tools between the different cycles and carries on with the control of the machine for operation with the new tool in each case. The automatic control is carried out by the use of an hydraulic operating circuit and a servo control system all coordinated by an electrical control circuit as will be now explained.

HYDRAULIC CONTROL CIRCUIT, FIG. 9

A hydraulic circuit for operating the head motor H, the saddle motor S, and the table motor T, is diagrammatically depicted in FIG. 9. The hydraulic circuit illustrated also includes the circuit for actuating the mechanism for effecting angular orientation of the spindles. In addition, the illustrated hydraulic circuit includes the circuit for effecting the engagement and disengagement of the drawbar mechanism associated with each of the spindles. The drawbar mechanism is illustrated schematically in FIG. 9 as a detailed description of the mechanism is not deemed necessary for the understanding of the present invention. However, a mechanism suitable for actuating the drawbar arrangement is similar to the power drawn bar illustrated and described in U.S. Pat. 3,038-386 issued to Parske et al., dated June 12, 1962.

Hydraulic fluid under pressure is withdrawn from a sump 500 by a pump 501 driven by a motor 502 to supply pressure fluid to line 503. The supply line 503 is connected to supply fluid pressure to a connected branch line 504 which, in turn, is connected to supply pressure fluid to the inlet port of the control valve 505 associated with the actuators for the draw-in bar mechanism that is associated with each of the spindles. Another port of the control valve 505 is connected to an exhaust line 506 by means of an interconnecting line 507. Upon energization of a solenoid 508, associated with the valve 505, the valve will be operated to direct the pressure fluid from the supply line 504 into a connecting line 514 from whence the pressure fluid will flow into a distribution line 515. The distribution line 515 is connected to supply the left ends of the cylinder actuators A1, A2 and A3 associated with the draw-in bar mechanisms of the spindles so as to effect the engagement of the clutch mechanism associated with each of the draw-in bar mechanisms and represented by the single clutch mechaninsm 516. With the clutch mechanism 516 engaged to the spindle, the switches 11LS, 9LS, and 10LS will each be actuated so that the electric drive motor 518 may be operated in a reverse or forward direction, depending upon which of the armature windings of the respective motors are energized and thereby operate the drawbar mechanism in a manner to release or engage the drawbar from the tool. When the solenoid 508, associated with the valve 505, is deenergized, the valve is spring returned to its initial position wherein pressure fluid from the line 504 is directed into the line 509 and thence is distributed to the right ends of the cylinder actuators A1, A2 and A3 to effect disengagement of the respective clutch mechanism 516 associated with each of the spindles. At this time, exhaust fluid from the left end of the cylinders A1, A2 and A3 will flow out of the cylinders into the connecting line 515, and by virtue of the line 514, will flow through the valve and into the return line 507 to be returned to the reservoir 500 via the return line 506.

Whenever a tool change is to be effected, the spindles will be stopped in an angular oriented position so that the keyway therein is positioned to receive the key of the new tools to be inserted in the spindles. To effect such angular orientation of the spindles, another hydraulic line 521 is connected to the main supply line 503 and operates to supply pressure fluid to a line 522 which is connected to an inlet port of the control valve 523. Another port of the valve 523 is connected to a branch return line 524 which, in turn, is connected to a return line 525. Upon energization of a solenoid 526 associated with the valve 523, the valve will be operated to direct pressure fluid from the branch supply line 522 into a connected distribution line 527 which, in turn, is in communication with the lower end of each of the actuating cylinders of the keylock mechanism associated associated with the spindle. Pressure fluid supplied to the lower end of each of the actuators 530, 531 and 532, respectively, will effect movement of their shot pins 530A, 531A and 532A, respectively, into interengagement into a notch formed on their respective spindles, thereby stopping the rotation of the spindle and locating the spindle in a predetermined angularly oriented position. As the shot pin actuators are energized to engage the shot pins with the spindles, exhaust fluid on the opposite sides of the pistons of the actuators will exhaust out of the cylinders into a common return line 533 and by operation of the valve 523 will flow through the valve into the connected return line 524 whence it will flow back to the tank via the connecting return line 525.

Rotation of a tool changer support for moving the tool changer from the parked position alongside the left edge of the table to an operating position depicted in FIG. 1, is effected by means of the hydraulic motor 535. Pressure fluid is supplied to the motor 535 from the supply line 503 which is connected to supply pressure fluid to the branch line 536 which, in turn, is connected to supply pressure fluid to the inlet port of the control valve 540 associated with the motor 535. Another port of the control valve 540 is connected to the exhaust line 506 by means of the connected line 533. Upon energization of a solenoid 541 associated with the valve 540, the valve will be operated to direct pressure fluid to a connected hydraulic line 542. With the solenoid 541 energized, another port of the valve is connected to a line 543 which is placed in communication with the branch return line 533 that communicates with the main return line 506. Under this condition, pressure fluid supplied to the conduit 542 is directed to the inlet port of the motor 535 to effect its operation in a direction to move the tool change support 18 from the parked position to the operating position shown in FIG. 1. Whenever the tool changer is to be moved from the operating position to its park position, the solenoid 541 is deenergized and a solenoid 544 associated with the valve 540 is energized. Under this condition, the valve will operate to direct pressure fluid from the branch supply line 536 through the valve into the line 543 whence it will enter into the opposite port of the motor 535 to effect the motor operation in the opposite direction, thereby moving the tool changer support from the operating position to its parked position depicted in FIG. 2.

With the tool changer in the operating position, it is moved forward on its support to engage the tools in the spindles which are to be interchanged for selected new tools. To effect the forward movement of the tool changer on its support, fluid pressure is supplied to the cylinder of the actuator 550. To this end, a hydraulic line 551 is connected to receive the pressure fluid from the branch supply line 521. The opposite end of the line 551 is connected to an inlet port of a control valve 555 that is associated with the actuator 550. Another port of the control valve 555 is connected to main return line 525 by means of a branch line 556. Upon the energization of a solenoid 557 associated with the valve 555, the valve will operate to direct pressure fluid from the branch supply line 551 through the valve and into a connected line 558. At this time, a line 559, which is in communication with the upper end of the cylinder of the actuator 550, is connected to the port of the valve 555. Thus, as pressure fluid is supplied to the actuator 556 via the line 558 to effect the maximum movement of the tool changer to engage the sockets thereof with the tools in the spindle, the upper end of the cylinder of the actuator 550 is connected to the return line 556. When it is desired to retract the tool changer out of engagement to clear the spindles, the solenoid 557 is deenergized and the valve is operated to connect line 558 to the branch return line 556. Thereupon, a spring within the cylinder of the actuator 550 acts upon the piston of the actuator to effect the movement of the piston to the lower end of the cylinder thereby effecting the retracting movement of the tool changer. When the tool changer has been engaged with the tools presented by the spindles and the head 7 elevated so that the spindles 11, 12 and 13 are retracted to clear the tool shanks, the tool changer is pivoted 90° to present the new tools 25, 26 and 27 with the tool shanks in the upper position to be engaged by the spindles of the head. This 90° rotation of the connected sockets of the tool changer is effected by means of the motor 560 which is energized for operation in either direction by fluid pressure obtained from the branch supply line 521 under the direction of the control valve 565. To this end, the branch supply line 521 is connected to the valve 565 by means of an interconnecting branch line 566. Another port of the control valve 565 is connected to a return line 567 which is in communication with the reservoir 500. Whenever a solenoid 568 associated with control valve 565 is energized, the valve is operated to direct a pressure fluid from the line 566 into a connected line 569 which is connected to a port of the motor 560. Another port of the motor 560 is connected to a line 571 which, in turn, is connected to a port of the valve 565 and which is now in communication with the return line 567 by operation of the valve 565. When the pressure fluid is supplied to the line 569, the motor 560 will operate in a direction to pivot the connected sockets of the tool changer, whereby the old tools that have been removed from the spindles are pivoted into a horizontal plane which action simultaneously moves new tools carried by the tool changer into a vertical plane with the shanks in the uppermost position for engagement by the spindles. When it is desired to rotate the tool changer sockets back to their original position, wherein the old tools removed from the spindles are in a vertical plane, the solenoid 568 associated with the valve 565 is deenergized and a solenoid 572 associated with the valve is energized. With this condition obtained, the valve is operated to direct fluid pressure from the line 566 into the line 571 for operating the motor in the opposite direction for reversing the rotation of the tool changer to return it to its original position wherein the tools removed from the spindle are in the vertical plane. Fluid from the pump 501 is also utilized for effecting the various positional movements of the table, saddle and spindle head as required. For effecting positional movement of the saddle, the motor S is under the control of the servo valve 600 which is supplied with pressure fluid by operation of a solenoid actuated valve 601. With the valve spool of the valve 601 biased to its leftwardly position, as shown in FIG. 9, the servo valve is connected via a line 603 and a passage in the valve plunger to a branch return line 604 that is connected to the main return line 506. Energization of the solenoid 605, which is accomplished in a well-known manner when the machine is ready for operation, effects the rightward movement of the valve spool of the valve 601 thereby connecting a branch pressure line 607 with line 603. The pressure fluid flows through the valve into the line 603 of the servo valve 600 which is operative upon a command signal to effect a flow of pressure fluid to the line 608 for actuating the motor S in a direction to move the saddle rightwardly across the machine frame. For controlling the rate at which the motor S is operated, the exhaust therefrom flows along a line 609 to the servo valve 601 which is now operable to control the rate of flow of exhaust pressure fluid therethrough and to direct exhaust fluid to a return line 611 which is connected to the main return line 506. On the other hand, should the desired movement of the saddle S be in a leftwardly direction, the operational command signals obtained from tape reader in response to the information contained on a tape that is being read by the reader will cause the servo valve 600 to effect the operation of the motor S in the opposite direction for moving the saddle leftwardly. Under this condition, the exhaust from the motor S will flow into the line 608 and be returned to the servo valve which operates to meter the exhaust fluid flowing therethrough for controlling the rate of leftward movement of the saddle with the discharge fluid flowing into the line 611 and returning to the reservoir via the main return line 506.

A similar arrangement is provided for effecting the movement of the spindle head 7 for positioning the spindles vertically. The spindle head motor H is under the control of a servo valve 615 which is supplied with pressure fluid by operation of a solenoid actuated valve 615 which is supplied with pressure fluid by operation of a solenoid valve 616. With the valve spool in its lowermost position within the cylinder of the valve 616, as depicted in FIG. 9, the servo valve 615 is connected via a line 617 and a suitable interconnecting passage in the valve spool to the return line 506. Energization of a solenoid 618 effects the upward movement of the valve spool thereby connecting the fluid supply line 503 to the line 617 so that pressure fluid is supplied to the servo valve. The pressure fluid supplied to the servo valve via the line 617 is directed by the servo valve which is under the operational control of command signals from the tape reader and directs the pressure fluid to a line 619 to actuate the hydraulic motor H for effecting its operation in a direction to move the head downwardly. The pressure fluid to the motor H will flow therefrom and into a connected line 620 and thence to the servo valve 615 which is operative at this time to meter the flow of exhaust fluid therethrough and to direct the exhaust fluid into a return line 621 which, in turn, is connected to the return line 506. However, should the operational command signal, which controls the servo valve 615, be such as to call for upward movement of the head, the servo valve would then be operated to direct the pressure fluid supplied thereto via the line 617 into the line 620 to effect the operation of the motor H in the opposite direction for moving the head upwardly. Under this condition, the flow of fluid to the motor H will flow into the line 619 and return to the servo valve to be metered thereby for controlling the rate of motor operation with the servo valve directing the exhaust fluid into the connected line 621 so that it is returned to the reservoir via return line 506. A like arrangement is provided for moving the table 1 longitudinally in a direction transversely of the direction in which the saddle and head are movable. For effecting the required movement of the table, the drive motor T is under the control of a servo valve 630 which is supplied with pressure fluid by operation of a solenoid actuated valve 631. With the valve spool of the valve positioned in the lowermost position, as depicted in FIG. 9, the servo valve 630 is connected via a line 632 to the common return line 567 by means of the suitable passage formed in the valve spool. Energization of a solenoid 633 effects upward movement of the valve spool within the body of the valve 631 thereby connecting a line 634 which is receiving pressure fluid from the branch pressure line 566 to the line 632 via another suitable passage formed in the valve spool. Pressure fluid then flows from the line 632 to the servo valve 630 and by its operation under the operational command signals originating in the tape reader will direct the pressure fluid to a line 636 to actuate the hydraulic motor T in a direction to effect leftward movement of the table, as viewed in FIG. 2. Fluid flowing through the motor T flows into a connected line 637 and returns to the servo valve which operates to control the rate of flow of the exhaust fluid for controlling the rate of operation of the motor T. The metered exhaust fluid discharge from the servo valve flows into a connected line 638 to return to the reservoir 500. Should the command signals which control the operation of the servo valve 630 be such as to operate the servo valve for directing the pressure fluid into the line 637 to effect the operation of the motor T in the opposite direction, the table will be moved rightwardly as viewed in FIG. 2. Under this condition, the exhaust from the motor T will flow into the line 636 and be returned to the servo valve which thereby operates to meter the exhaust fluid flowing therethrough for controlling the rate of rightward movement of the table with the discharge fluid flowing into the line 638 to return to the reservoir 500.

SERVO CONTROL

Figure 8:
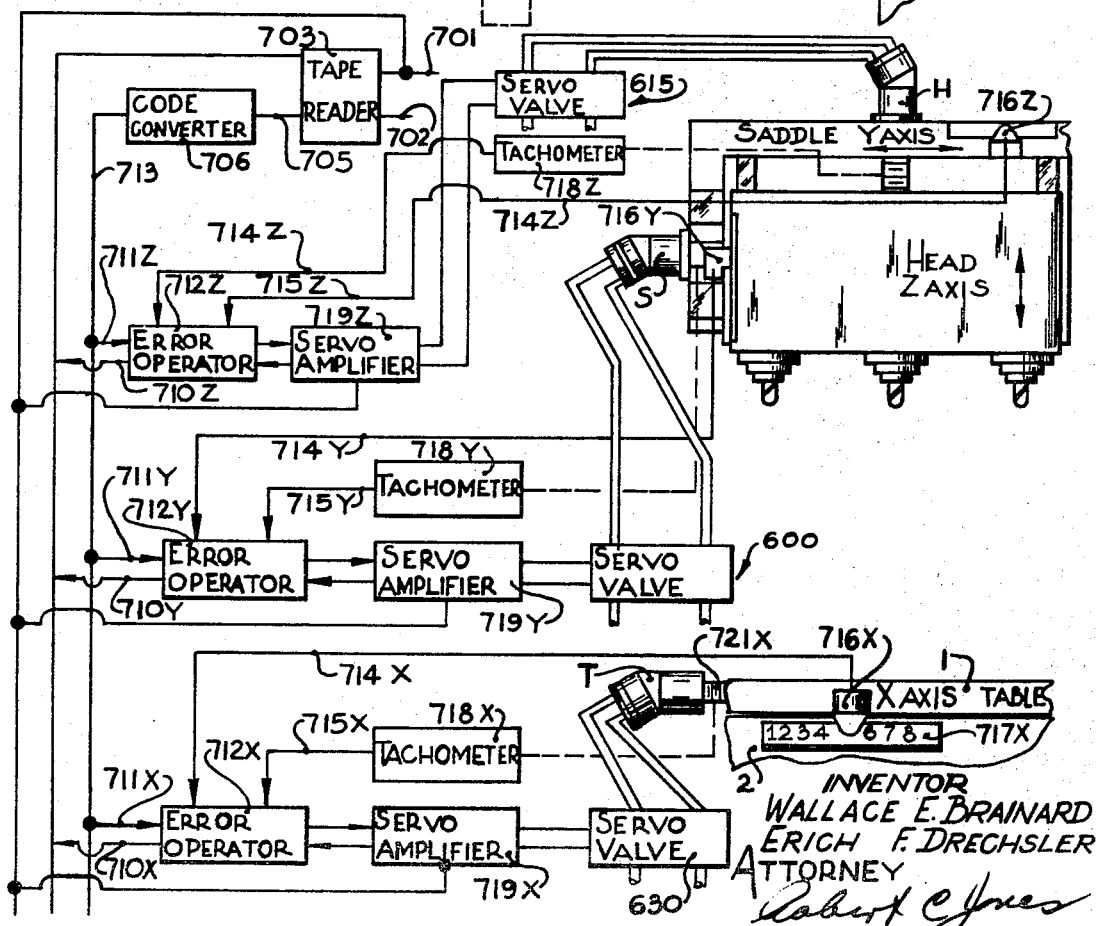
FIG. 8 is a diagrammatic block diagram showing the control circuit for effecting automatic selective movement of the movable machine elements in response to tape input.

To effect bodily movement of the major movable members of the table, saddle and head along X, Y and Z axes, respectively, there is provided a tape control system schematically shown in FIG. 8. As there shown, energized conductors 701 and 702 are directly connected to energize a tape reader 703 which is operative in well-known manner to transmit output signals from a coded punch tape 704, shown in FIG. 8, to an output conductor 705. The tape reader 703 is adapted to transmit digital information from moving tape 704 of the well-known punch type to effect movement of the major movable members as well as supplying, where required, a signal for initiating a tool change cycle. As is well-known in the art, the tape reader 703 is provided with a plurality of switches operative in binary code fashion by means of switch plungers engaging appropriately spaced holes in the punched tape, as the tape is mechanically advanced relative to the reader. From the reader 703, the conductor 705 is operable to activate a code converter 706 which, in turn, is disposed to convert information from the tape code to decimal code. This information is stored and registered in the form of sine-cosine voltage ratios (from a source not shown) for predetermined selected point-to-point positioning. The registers (not shown) in the code converter also store the linear voltage ratios for velocity control. In addition to converting and storing information for the X, Y and Z axes, the code converter 706 is also operative to store information in binary code form relative to required speeds of the spindles and for operating the unitary tool storage and tool change means for interchanging stored tools with the tools carried by the spindles.

For the purpose of simplifying the description, the three branch conductors and their error operators have been respectively designated by common reference numerals 711 and 710, each being followed by an appropriate letter suffix to indicate the particular movement being controlled. Conductor 711X, for example, transmits information from the trunk line 713 to activate the error operator 712X for supplying both positional and velocity control information for moving the table along the X axis. The error operator 712X is operative to receive feedback information via lines 714X and 715X, the latter being respectively connected to supply feedback information as to the position of the table along the X axis and the information as to the velocity of the table as it is being moved along the X axis. To provide accurate position feedback information, the line 714X is connected to a position indicator or a reading head 716X which is secured directly to the table 1. The reading head 716X is carried for movement relative to a cooperating scale 717X that is secured directly to the supporting frame or bed 2 and connected to be energized by means of supply conductors (not shown) in a well-known manner. Coaction between the reading head 716X and the scale 717X provides accurate feedback information signals for indicating the positions of the table along the bed as it is moved to a selected position along the X axis. The cooperating reading head 716X and energizable scale 717X are schematically representative of well-known commercially available units that are operative in the manner described to supply position feedback information.

To provide feedback information as to the velocity of the table as it is moved along the bed, the line 715X is connected to receive information from a tachometer 718X which is mechanically connected to be driven by movement of the table. The error operator 712X operates to produce voltage proportional to the magnitude of the error, as well as indicate the direction of position error. The voltage ratios of binary numbers stored in the code converter 706, irrespective of whether they are operative to obtain positional velocity input signals, are compared to the corresponding voltage ratios in binary numbers from the feedback conductors connected to the error operator 712X, with motion being stopped upon the occurrence of coincidence between the feedback supply and the code converter information.

From the error operator 712X, command control information is transmitted to actuate a servo amplifier 719X which is directly connected to accurately control the velocity and extent of movement of the reversible power actuator represented by the motor T which is directly connected to drive the table moving translating screw 721X that, in turn, is connected to be engaged by a nut (not show) directly secured to the underside of the movable table in a well-known manner. The general arrangement for effecting the horizontal movement of the worktable along the X axis is similar to that utilized for effecting the required transverse movement of the saddle along the Y axis and the vertical movement of the head along the Z axis. As schematically represented in FIG. 10 and as previously mentioned, the error operator 712X operates to produce a voltage proportional to the magnitude of the error as well as to indicate the direction of positioning the error. These voltages are compared to corresponding voltages supplied by the reading head 716X and scale 717X and the tachometer 718X to the error operator 712X. The error operator 712X thereupon operates to produce command signals or error signals that are transmitted to actuate the servo amplifier 719X which is directly connected to control the servo valve 630 that is operable to control the velocity and extent of movement of the reverse motor T. The operation of the motor T will stop upon the occurrence of zero error between the feedback signals and the input signals obtained from the code converter 706.

As hereinbefore mentioned, the various elements designated by common reference numerals in the block diagram of FIG. 8 are operative in a similar manner to perform identical functions although the placement of the various elements is completely different in the associated machine structure, depending upon the particular structure component that it is associated with. Thus, in order to operate the saddle motor S, its valve 600 is operated by the servo amplifier 719Y under the control of the error operator 712Y which receives signals from the tape and these signals are modified by the tachometer 718Y and the reading head 716Y of the positioning indicator. In a similar manner, the servo valve 615 of the spindle head motor H is operated by the servo amplifier 719Z under control of the error operator 712Z which receives its signals from the code converter and these signals are modified by the tachometer 718Z and the reading head 716Z of the positioning indicator. These elements are connected in the circuit in a manner similar to the connections for the elements that control the table motor, and since these connections are obvious, they need not be described.

ELECTRICAL CONTROL CIRCUIT, FIG. 10

The electrical circuit for effecting the operation of the tool change cycle is shown schematically in FIG. 10. As there shown, the various horizontal control conductors designated as L1 to L37, inclusive, are operatively interconnected between energized vertical conductors 800 and 801. The energized conductors 800 and 801 are connected to be energized from a source of power (not shown) by actuating switching means (not shown) in a well-known manner.

Prior to initiating a tool change cycle of operation, signals will have been provided from the tape to effect automatic movement of the saddle 5, spindle head 7 and table 1, to a tool change initial position. In the initial position, the table 1 will be in a full leftward position, as viewed in FIG. 2, wherein a workpiece (not shown) carried on the table will be in a non-interfering position relative to the spindles 11, 12 and 13; the spindle head 7 will be in a vertical position in which the annular recesses 37 of the tools in the spindle will be in the same horizontal plane in which the sockets 28, 29 and 30 of the tool change mechanism are located, and the saddle 5 will be in the position depicted in FIG. 1, wherein the axes of the spindles 11, 12 and 13 are located in vertical planes which will coincide with the axes of the sockets 28, 29 and 30 when the changer mechanism is moved to an advance position, as depicted in FIG. 4. With the saddle, head and table in their initial tool change positions, limit switches 1LS, 2LS and 3LS will be actuated and the contacts thereof closed.

To initiate the tool change cycle, an input signal obtained from the tape 704 is read by the tape reader 703 to effect closure of a normally open automatic contact MO6, line L1. With the limit switches 1LS, 2LS and 3LS actuated closed, the closure of the automatic contact MO6 will effect the pick-up of relay MO6X, line L1. The tape function will now stop and will be started later by a tape start relay TS, line L12.

Energization of the MO6X relay will close the normally open MO6X contact in line L2 to effect the pick-up of the tool change sequence start relay TCSS. The normally open contact TCSS in line L35 will now close effecting the pick-up of solenoid 526 which actuates the shot pins 530A, 531A and 532A in a direction to engage a notch on the circumference of their associated spindles which will locate the spindles in a keylock position. The closing of the normally open contact TCSS, line L35, will also pick up the keylock relay KLR, line L36. Lines A, B and C, located on the bottom of FIG. 10, show the spindle motor armature circuits which are run at a reduced voltage.

Energization of the keylock relay KLR, line L36, will effect the closure of the keylock relay contacts in the spindle motor circuits thereby effecting the energization of the motors 14, 15 and 16 to rotate the spindles at a slow speed until they reach their respective keylock positions at which time the shot pins will actuate their associated limit switches 4LS, 5LS and 6LS which, as depicted schematically, are connected in series in line L37.

With the shot pins engaged, the spindles will be stopped in an angular orientated position so that the keyways therein are positioned to receive the keys of the new tools to be inserted in the spindles. With this condition obtained, the KLC relay in line L37 will be picked up, and the associated three normally closed KLC contacts in lines A, B and C will open, thereby effecting the deenergization of the spindle motors 14, 15 and 16. Also, the normally open KLC contact at line L7 in the vertical conductor 800 will close. Since the normally open TCSS contact at line L6 in the vertical conductor 800 has been previously closed, the closing of the KLC contact in conductor 800 will operate to complete a circuit to line L8.

The control power will proceed through the normally closed contact TCSH in line L8 and pick up solenoid 541, which activates the control valve 540 to operate the motor 535 in a direction to swing the tool changer from the parked position, sitting along the left side of the table as depicted in FIG. 1, to an operating position wherein the tool changer is disposed parallel to the spindle head, as depicted in FIGS. 2 and 3. When the tool changer reaches its operating position, limit switch 20LS, line L9, will be actuated closed and solenoid 557 will be picked up through the normally closed contact TCR. The picking up of solenoid 557 will activate the valve 555 and thereby effect the advance of the tool changer to engage the sockets 28, 29 and 30 with the tools in the spindles which are to be interchanged for selected new tools. When the tool changer reaches its fully advanced position, a limit switch 8LS in line L10 will be actuated closed, effecting the pick-up of a drawbar release timer relay DBR-T. A normally open instantaneous DBR-T contact in line L11 will now close picking up the DBR relay. With the relay DBR picked up, its associated normally open contact in line L24 is closed thereby completing a circuit along line L24 to effect the pick-up of solenoid 508 in line L25 which activates valve 505 to effect the engagement of the clutch mechanism associated with drawbar mechanisms A1, A2 and A3. With the spindle clutch mechanisms engaged, the limit switches 9LS, line L26, 10LS, line L29, and 11LS, line L32, will each be closed. The operation of the spindle drawbar motor connected with limit switch 9LS will be described with the understanding that the description of the operation of the drawbar motors for the other two spindles actuated by limit switches 10LS and 11LS will be the same.

With limit switch 9LS in line L26 closed, and with the DBR normally open contact closed, the 4MF motor contactor will now pick up, driving the drawbar motor in a direction to disengage the threaded drawbar from the tool. After a few seconds, which is all the time needed to disengage the drawbar from the tool, the DBR-T time open contact in line L11 will open, dropping out the DBR drawbar release relay. Dropping out the DBR relay will also drop out 4MF drawbar motor contactor to stop the operation of the drawbar motor. At the same time that the DBR-T time open contact in line L11 opens, the DBR-T time close contact in line L12 will close, effecting the pick up of the tape start signal relay TS through the time close DBR-T contact and the deactuated normally closed limit switch 7LS and the normally closed TCFR contact, line 13.

With the drawbars disengaged from the tools and the tape TS relay picked up, the tape will call for the head to be retracted to clear the tool shanks. When the spindle head is fully retracted, the switch 13LS, line L14, which indicates that the spindle head has been retracted and is in tool change position 2, is actuated closed effecting the pick-up of the solenoid 568, line L14, which will activate the valve 565 to pivot the tool changer 90° to present the new tools with their shanks in vertically upwardly extending positions to be engaged by the spindles of the head. When the tool changer is rotated the full 90°, limit switch 14LS, in L16, will be actuated closed effecting the pick-up of the tool changer fully rotated relay TCFR through the now closed DBR-T contact.

With the spindle head in the retracted tool change position 2, wherein the limit switch 13LS is actuated, a programmed signal will be obtained from the tape to effect the leftward movement of the saddle from the position it occupies in FIGS. 1 and 3, to a position wherein the axes of the spindles 11, 12 and 13 are in vertical planes in which the axes of the new tools 32 in the sockets 25, 26 and 27, respectively, are located. The limit switch 7LS will be actuated when the saddle is in leftward position. However, at this time, the tape TS relay is maintained energized through a holding circuit along line L12 through deactuated now closed limit switch 2LS, in vertical conductor which interconnects lines L12 and L13, through the now closed normally open contact TCFR and thence through the time to close now closed contact DBR-T. With this condition obtained, a programmed signal from the tape will effect the movement of the spindle head from its upper position 2 downwardly to tool change position 1 thereby engaging the spindles with the upwardly facing tool shanks of the new tools presented by the tool changer.

Figure 6:
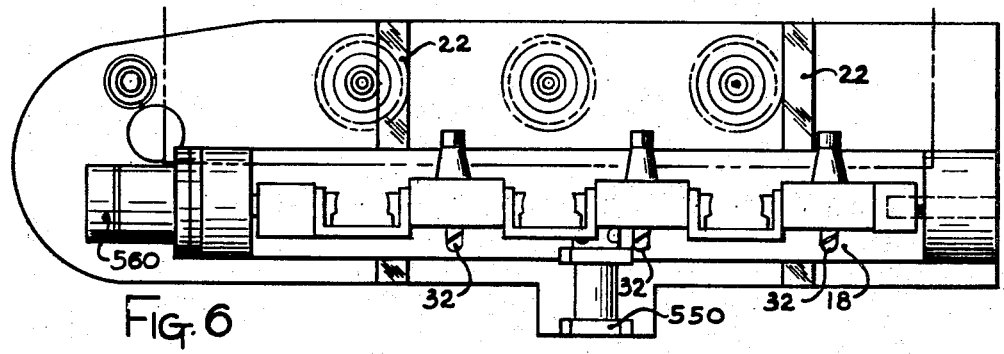
FIG. 6 is a top view of the tool changer showing the sockets in the retracted position thereon.

With the head engaged with the new tools, the Z axis tool position 1 limit switch 2LS, in line L1, will close thereby establishing a circuit down to line L17 through the now closed TCFR contact and through the now closed portion of the Y axis limit switch 7LS to pick up the drawbar pull timer DBR-T relay. The instantaneous DBP-T contact in line L18 will now close, and since the DBP-T time open contact is closed, the drawbar pull relay DBP will be picked up. The energization of the DBP relay will effect the closing of the DBP contact in line L25 and solenoid 508 will be picked up. With the drawbar solenoid 508 energized, it operates to effect the engagement of the clutch mechanism associated with each drawbar mechanism. With the clutch engaged to the three spindles, the limit switches 9LS, line L26, 10LS, line L29, and 11LS, line L32, will each be closed. Again, only the spindle drawbar mechanism associated with limit switch 9LS will be considered with the understanding that the same sequence and action applies to the spindles associated with limit switches 10LS and 11LS. With limit switch 9LS closed and with the DBP normally open contact in line L28 closed, the 4MR contactor will pick up and rotate the drawbar in a direction to engage it with the new tool. After a few seconds, the DBP-T time open contact in line L18 will open dropping out the DBP relay to stop the operation of the drawbar motor. Simultaneously, the DBP-T time close contact in line L19 will close picking up the tool change reverse relay TCR. The normally closed TCR contact in line L9 will now open dropping out solenoid 557 which will retract the tool changer sockets away from the spindle head to a retracted position, as depicted in FIG. 6. When the sockets of the tool changer are fully retracted, the tool changer return limit switch 16LS in line L20 is actuated closed and the tool changer swing home relay TCSH is picked up, and simultaneously therewith, the solenoid 544 through the closed contact DBP–T in line L20 is also picked up. Energization of solenoid 544 will activate the valve 540 to effect the movement of the tool changer to its home parked position. When the tool changer reaches its home parked position, limit switch 17LS, line L22, will close picking up the tool changer rotate home relay TCRT and solenoid 572 which rotates the connected sockets of the tool change 90° back to their original positions. Simultaneously, with the energization of the solenoid 572, its associated solenoid 568 is dropped out by the opening of the normally closed TCRT contact in line L14. The two solenoids 568 and 572 thus electrically interlocked so they cannot both be energized at the same time. The same thing applies for the TCSH relay in line L20 in which its normally closed contact in line L8 will open and drop out solenoid 541 for the same reason.

The previously mentioned TCSS relay seals in through line 5, but after the DBP–T relay is picked up, the DBP–T contact in line L5 will open and the TCSS relay will drop out. Since we do not want this to happen until the tool change sequence is over, there are provided two additional contacts for switches 17LS and 19LS in lines L3 and L4, respectively. The normally closed contact of limit switch 17LS in line L3 is closed while the tool changer is swung from its parked position; the normally closed contact of limit switch 19LS in line L4 is closed while it is rotated 90° from its original position. Therefore, as the tool changer is swung to its home position after the new tools have been placed in the spindles and the tool changer rotated 90°, the limit switches 17LS and 19LS will be opened, dropping out the TCSS relay and resetting the circuit for when the next tool change cycle is called for.

OPERATIONAL SEQUENCE

After controlling the table, saddle and head movements by the tape for carrying out the necessary macanining operations with the tools then in the spindles, the tape moves the head, saddle and table to interchange position 1, and as these elements reach that position, they close limit switches in a series circuit with switch MO6, line L1. Closing of the switch MO6 initiates the operation which stops the tape and starts the tool interchange sequences which operates the shot pins towards the spindles, reduces the speed of the spindle motors so that the shot pins may enter the slots in the spindles and tops the spindles at properly orinted keylock position. When the shot pins fully enter the slots, limit switches are activated to swing the tool changers from inoperative position to operative position wherein the tool changer upon being swung to operative position hits the limit switch 20LS which picks up the solenoid 557 to advance the U-shaped support to engage the connected sockets with the tools then in the spindles. The fully advanced position of the tool changer support hits the limit switch which actuates the drawbar release relay to actuate the drawbar to release the tools, which circuit includes a time device switch. The operation of the time device switch starts the tape which moves the spindle head to retract the tools to clear the connected sockets, moves the saddle laterally to align the spindles with the new tools, rotates the connected tool sockets 90° and calls for the head to move down for engagement of the spindle with the new tools, the downward movement of the head actuating limit switch that actuates the drawbar to grip the tools under a control time relay. At the end of the time set by the relay, retraction of the connected sockets is initiated and then the swing home of the tool changer to inoperative position which actuates the connected sockets for rotation of 90°. When the sockets are rotated 90°, a limit switch starts the tape for controlling the table, saddle and spindle head for carrying out a machining operation with the new tools. During this time, the tools are changed in the tool changer at its home position which renders the changer ready for operation when the tape again calls for new tools.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the adjoining claims. Purely as example only, the tools exchanged can be different tools, or in excessive machining, can be the substitution of sharp tools for tools that have become dull, and although spindles have been disclosed, they could be various other types of toolholders in different types of machines.

The principles of this invention having now been fully explained, we hereby claim as our invention:

1. In a machine tool:
    a plurality of spindles each mounting a tool;
    a tool change mechanism constructed and arranged to simultaneously replace each tool in the spindle with a tool brought by the tool change mechanism, said tool change mechanism including two groups of tool carriers with the number of tool carriers in each group being equal in number to the number of spindles, the carriers of one group being empty for receiving the previously used tools in the spindles, the carriers of the other group each holding a replacement tool for the spindles;
    means mounting the tool carriers of each group to move as a unit, including a main frame movable from an inoperative position to an operative position adjacent the plurality of spindles; and
    a sub-frame for said two groups of carriers movably supported by the main frame from a retracted position wherein the empty carriers are each in alignment with a spindle.

2. In a machine tool:
    a plurality of spindles adapted to removably carry tools for the performance of work operations;
    programming mechanism for operating the spindles in a plurality of cycles of machining operations with a different tool in each spindle for each cycle of operation;
    tool change mechanism operating under the control of said programming mechanism for changing tools in each spindle between cycles, said tool change mechanism comprising two groups of tool carriers, the carriers of each group being equal in number to the spindles of the machine tool, said tool change mechanism arranged for moving said groups of tool carriers in unison from an inoperative position to an operative position;
    means carried by said tool change mechanism for aligning one group of tool carriers with the spindles for receiving the tools in the spindles;
    second means operable to subsequently align the other group of tool carriers for presenting tools next to be used to the spindles;
    means under the control of said programming mechanism operable to position the machine spindles in a tool change position; and,
    said tool carriers that are to receive the tools from the spindles each including tool grippers that will automatically receive and grip the tools as they are moved into alignment with the spindles, so that the spindles may be moved to release the tools.

3. In a machine tool:
a plurality of spindles adapted to receive tool for the performance of work operations;
control means for operating the spindles in a number of cycles of machining operations;
tool change mechanism operating under the control of said control means for changing the tools of each spindle as desired, said tool change mechanism including a main frame supported for movement from an inoperative position to an operative position;
a sub-frame supported on said main frame for movement therewith;
two groups of tool carriers in said sub-frame, the tool carriers in each group being equal in number to the number of machine spindles, said groups of tool carriers being constructed and arranged on the sub-frame for rotation, so that the group of tool carriers to receive tools from the spindles are positioned vertically and the group of tool carriers in which the next tools to be used in the spindles are located and positioned horizontally, so that after the first group of tool carriers receive the tools from the spindles, the two groups of tool carriers may be rotated to locate the tools carried by the second group of tool carriers in position to be received by the spindles.

4. In a machine in accordance with claim 3, including programmed control to move said spindles to tool change position:
means to move said frame from an inoperative position to an operative position;
means to move said sub-frame to align the group of empty tool-holders for receiving and gripping the tools then in the spindles;
means causing the spindles to move away from the gripped tools and horizontally to align the spindles with the tools next to be used;
means rotating the two groups 90 degrees to properly present the tools next to be used;
means causing the spindles to move downwardly to receive the presented tools and move upwardly to remove the tools from the toolholders; and,
means to cause the sub-frame to move to retracted position and the frame to move to inoperative position, said several means being partly controlled by said programming mechanism and partly controlled by limit switches.

5. In a machine in accordance with claim 4, wherein said tools are cutters and said cutters are secured to and released from said spindles by drawbar mechanism acting under the control of said programming mechanism.

6. In a tool change mechanism in accordance with claim 5, wherein a frame is mounted to move from an inoperative position to an operative tool change position adjacent the tools to be changed;
a sub-frame is mounted for sliding movement on the frame; and
both groups of toolholders are mounted for their 90 degree rotation on the sub-frame.

7. In a tool change mechanism in accordance with claim 6, wherein the sliding movement of the sub-frame moves the toolholders of one group toward the tools to be replaced and said toolholders each having tool grips that automatically grip the tools in such movement.

8. In a tool change mechanism in accordance with claim 7, wherein the grips of each toolholder include opposed arcuate gripping surfaces, each pivotally mounted; and resilient means to urge the arcuate surfaces into gripping position.

References Cited
UNITED STATES PATENTS

| | | | |
|---|---|---|---|
| 3,188,736 | 6/1965 | Brainard et al. | 29—568 |
| 3,249,997 | 5/1966 | Hutchens | 29—568 |
| 3,256,600 | 6/1966 | Swanson et al. | 29—568 |
| 3,428,190 | 2/1969 | Joichi | 214—1B2 |
| 3,288,032 | 11/1966 | Pankonin et al. | 29—568X |

ANDREW JUHASZ, Primary Examiner

F. R. BILINSKY, Assistant Examiner

U.S. Cl. X.R.

214—1